US007894080B2

(12) United States Patent
Pan

(10) Patent No.: US 7,894,080 B2
(45) Date of Patent: Feb. 22, 2011

(54) WIDTH AND THICKNESS DETECTING MECHANISM OF A SHREDDER

(75) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 267 days.

(21) Appl. No.: 12/369,559

(22) Filed: Feb. 11, 2009

(65) Prior Publication Data

US 2010/0134805 A1 Jun. 3, 2010

(30) Foreign Application Priority Data

Dec. 1, 2008 (TW) .............................. 97146569 A

(51) Int. Cl.
*G01B 11/28* (2006.01)

(52) U.S. Cl. ........................................ 356/630; 241/34

(58) Field of Classification Search ....................... None
See application file for complete search history.

(56) References Cited

U.S. PATENT DOCUMENTS 7,584,545 B2 * 9/2009 Pan ......................... 241/101.3
7,635,102 B2 * 12/2009 Matlin et al. ................ 241/100
7,712,689 B2 * 5/2010 Matlin et al. ................ 241/100
2008/0093487 A1 * 4/2008 Lee et al. .................... 241/236
2009/0032629 A1 * 2/2009 Aries et al. ................. 241/236
2010/0090038 A1 * 4/2010 Jensen ......................... 241/30

* cited by examiner

*Primary Examiner*—Gregory J Toatley
*Assistant Examiner*—Juan D Valentin
(74) *Attorney, Agent, or Firm*—Kirton & McConkie; Evan R. Witt

(57) ABSTRACT

A width and thickness detecting mechanism of a shredder includes a shredding path, a first width sensor, a second width sensor, a third width sensor, a thickness detecting module, and a control unit. The thickness detecting module includes two thickness sensors. After the width of the article is detected by means of the first width sensor, the second width sensor and the third width sensor, a proper thickness sensor is allocated to detect the thickness of the article.

11 Claims, 5 Drawing Sheets

WIDTH AND THICKNESS DETECTING MECHANISM OF A SHREDDER

FIELD OF THE INVENTION

The present invention relates to a detecting mechanism, and more particularly to a width and thickness detecting mechanism of a shredder.

BACKGROUND OF THE INVENTION

Nowadays, shredders are widely used to cut sheet-like articles. If a relatively thick article whose thickness is beyond an acceptable range (for example a thick paper or a compact disc) is shredded, the thick article is readily jammed. Under this circumstance, the shredder has a usage problem or even a breakdown. For avoiding the occurrence of the jamming event, a thickness triggering device is often mounted in the shredder to determine whether the article to be shredded is beyond the acceptable range.

FIG. 1 is a schematic perspective view illustrating a shredder having a thickness triggering device according to the prior art. The shredder 100 includes an entrance 101, a shredding path 102, a sustaining element 103, a thickness sensing module 104, a driving assembly 105, a transmission gear set 106 and a shredding knife assembly 107. The entrance 101 is disposed above the shredding path 102. The sustaining element 103 is arranged at a side of the shredding path 102. The thickness sensing module 104 is disposed behind the sustaining element 103. As shown in FIG. 1, the thickness sensing module 104 includes a light emitter 1041 and a light receiver 1042. The thickness sensing module 104 and the sustaining element 103 are collectively referred as a thickness triggering device. The shredding knife assembly 107 is disposed at the outlet of the shredding path 102. The transmission gear set 106 is interconnected between and engaged with the shredding knife assembly 107 and the driving assembly 105. As a consequence, the shredding knife assembly 107 can be driven by the driving assembly 105 to implement a shredding operation.

The operation of the shredder 100 will be illustrated as follows. First of all, an article (not shown) to be shredded is introduced into the shredding path 102 through the entrance 101. When the article is in contact with and sustained against the sustaining element 103, the sustaining element 103 is shifted backwardly to result in a shift distance with respect to its original place. In the thickness sensing module 104, the light emitter 1041 continuously emits the sensing light and the sensing light is received by the light receiver 1042. In a case that the sustaining element 103 fails to completely shelter the sensing light, the article is permitted to feed through the shredding path 102 so as to perform a shredding operation. Whereas, if the sensing light is sheltered by the sustaining element 103, the shredding operation of the shredder 100 is interrupted.

That is, in the case that the shift distance of the sustaining element 103 is not sufficient to completely shelter the sensing light emitted from the light emitter 1041, the thickness of the article is acceptable by the shredder 100. Under this circumstance, the article is continuously advanced in the shredding path 102. In addition, the shredder 100 has a shredding sensor (not shown) under the sustaining element 103. When the advancing article approaches the shredding knife assembly 107, the shredding sensor will detect the presence of the article. Meanwhile, the transmission gear set 106 is driven by the driving assembly 105 and begins to rotate. Upon rotation of the transmission gear set 106, the shredding knife assembly 107 is driven to implement a shredding operation.

As previously described, by using the sustaining element 103 and the thickness sensing module 104, the usage status of the shredder 100 may be determined according to the thickness of the article to be shredded. In other words, the sustaining element 103 and the thickness sensing module 104 are advantageous of avoiding the problem of causing jammed paper so as to extend the operating life of the shredder 100.

However, this shredder 100 still has some drawbacks. For example, the torsion force of the shredding knife assembly 107 is dependent on the width of the article to be shredded. As the width of the article is increased, the torsion force of the shredding knife assembly 107 is increased and thus the shredding knife assembly 107 is possibly fractured or damaged. For decreasing the loading of the shredding knife assembly 107, a wider article needs to be relatively thinner. As previously described, the thickness triggering device of the shredder 100 is capable of determining whether the article is beyond a specified thickness. If a wider article having an acceptable thickness is introduced into the shredding path 102, the possibility of causing the jamming event or fracturing the shredding knife assembly 107 is increased because the torsion force exerted on the shredding knife assembly 107 is increased.

SUMMARY OF THE INVENTION

It is an object of the present invention to provide a width and thickness detecting mechanism of a shredder for detecting the width and the thickness of an article to be shredded.

In accordance with an aspect of the present invention, there is provided a width and thickness detecting mechanism of a shredder for detecting a width of an article and adjusting an allowable thickness value of the article according to the width of the article. The width and thickness detecting mechanism includes a first width sensor, a second width sensor, a third width sensor, a thickness detecting module, and a control unit. The first width sensor is disposed in a shredding path. The second width sensor is disposed at a first side of the first width sensor. The third width sensor is disposed at a second side of the first width sensor. The thickness detecting module is disposed in the shredding path and includes a sustaining element, a thickness detecting element, a first thickness sensor and a second thickness sensor. The sustaining element is moved as the article is sustained against the sustaining element. The thickness detecting element is contacted with the sustaining element and rotated as the sustaining element is moved. The thickness detecting element includes a first detecting plate with multiple first sheltering parts and a second detecting plate with multiple second sheltering parts. The first thickness sensor realizes whether a thickness of the article is greater than the first allowable thickness value according to the rotating condition of the first sheltering parts. The second thickness sensor realizes whether the thickness of the article is greater than the second allowable thickness value according to the rotating condition of the second sheltering parts. The control unit is connected to the first width sensor, the second width sensor, the third width sensor, the first thickness sensor and the second thickness sensor for controlling implementation or interruption a shredding operation according to the width and the thickness of the article. If any two of the first width sensor, the second width sensor and the third width sensor sense that the article enters the shredding path, the width of the article is deemed as a first article width and the control unit allocates the first thickness sensor to detect whether the thickness of the article is greater than the first allowable thickness value. If all of the first width sensor, the second width sensor and the third width sensor sense that the article enters the shredding path, the width of the article is deemed as a second article width and the control unit allocates the second thickness sensor to detect whether the thickness of the article is greater than the second allowable thickness value.

In an embodiment, the shredding operation is interrupted under control of the control unit if the first thickness sensor discriminates that the thickness of the article is greater than the first allowable thickness value, or the shredding operation is continuously under control of the control unit if the first thickness sensor discriminates that the thickness of the article is equal to or smaller than the first allowable thickness value.

In an embodiment, the shredding operation is interrupted under control of the control unit if the second thickness sensor discriminates that the thickness of the article is greater than the second allowable thickness value, or the shredding operation is continuously under control of the control unit if the second thickness sensor discriminates that the thickness of the article is equal to or smaller than the second allowable thickness value.

In an embodiment, the first width sensor, the second width sensor, the third width sensor, the first thickness sensor and the second thickness sensor are optical sensors continuously emitting sensing lights. The first width sensor, the second width sensor, the third width sensor, the first thickness sensor and the second thickness sensor are triggered when respective sensing lights are sheltered.

In an embodiment, the first article width is 210 mm and the second article width is 297 mm.

In an embodiment, the first article width is smaller than the second article width.

In an embodiment, the first sheltering parts and the second sheltering parts are saw-toothed structures. The thickness of the article is estimated by counting the total number of saw-toothed structures that have sheltered respective sensing light emitted from the first thickness sensor or the second thickness sensor.

In an embodiment, the first sheltering parts and the second sheltering parts are perforations. The thickness of the article is estimated by counting the total number of perforations that have transported across respective sensing range of the first thickness sensor or the second thickness sensor.

In an embodiment, the first detecting plate and the second detecting plate are integrally formed with the thickness detecting element.

In an embodiment, the thickness detecting element has a first rack part, and the sustaining element has a second rack part engaged with the first rack part, so that the thickness detecting element is rotated as the sustaining element is linearly moved.

In an embodiment, the sustaining element has sustaining roller, which is sustained against the article for facilitating transporting the article in the shredding path.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a width and the thickness detecting mechanism of a shredder. According to the width or the article to be shredded, the allowable thickness value of the article is adjusted.

Figure 1:
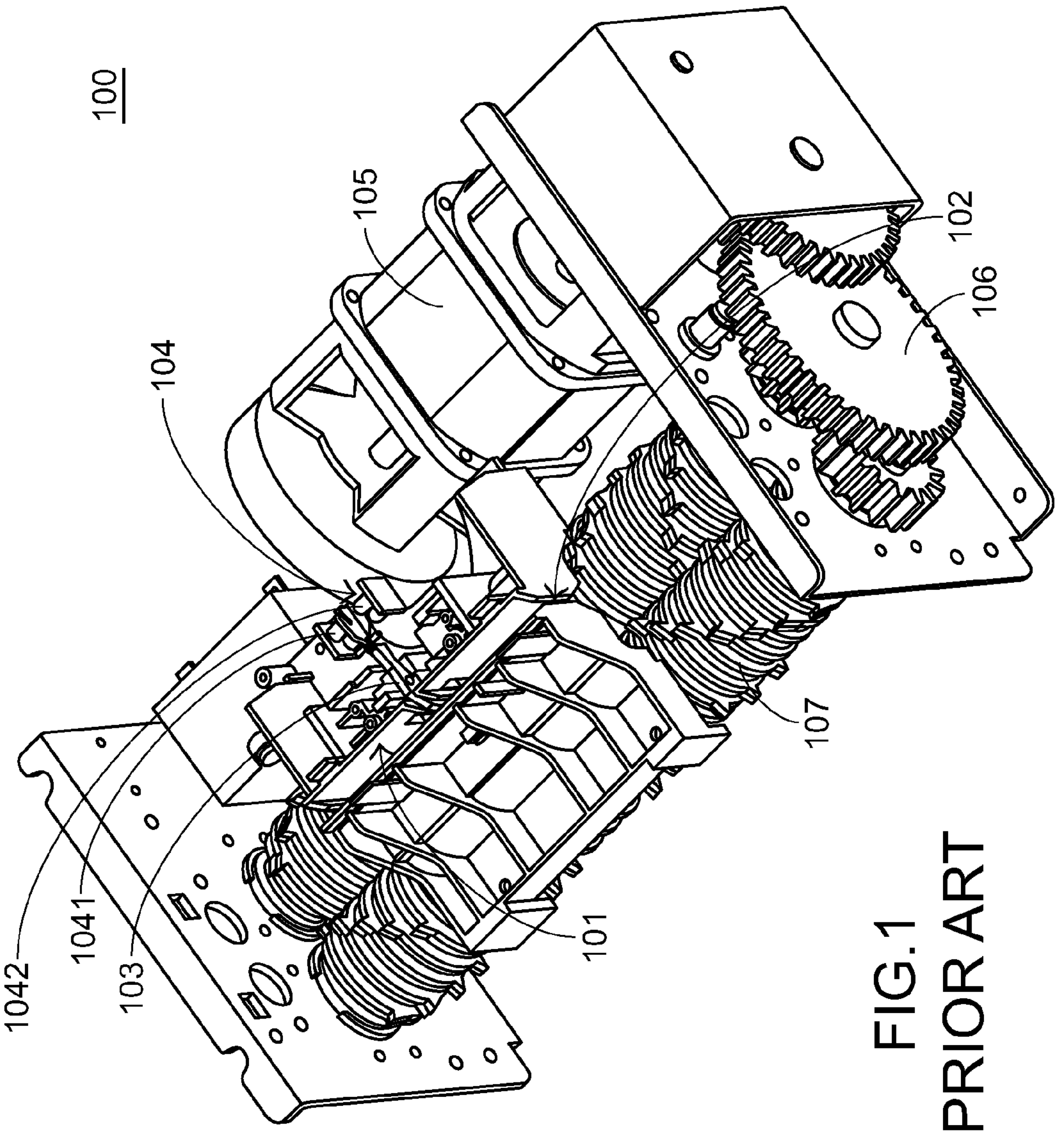
FIG.1 PRIOR ART
FIG. 1 is a schematic perspective view illustrating a shredder having a thickness triggering device according to the prior art.
Figure 2:
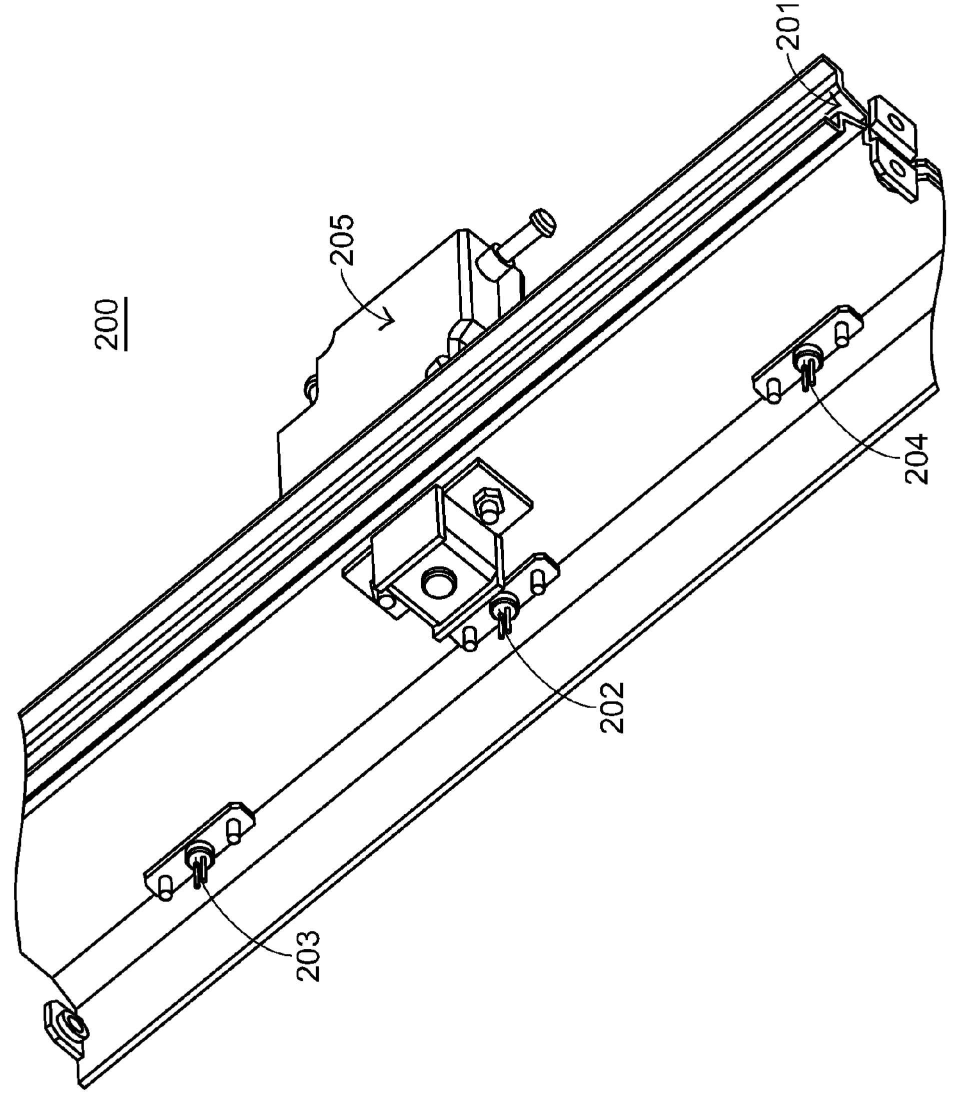
FIG. 2 is a schematic perspective view illustrating width and thickness detecting mechanism of a shredder according to a preferred embodiment of the present invention.

FIG. 2 is a schematic perspective view illustrating a width and thickness detecting mechanism of a shredder according to a preferred embodiment of the present invention. As shown in FIG. 2, the width and thickness detecting mechanism 200 principally comprises a shredding path 201, a first width sensor 202, a second width sensor 203, a third width sensor 204, a thickness detecting module 205 and a control unit (not shown). The article (not shown) to be shredded needs to be introduced into the shredding path 201. The first width sensor 202 is disposed in the shredding path 201. The second width sensor 203 is disposed at a first side of the first width sensor 202. The third width sensor 204 is disposed at a second side of the first width sensor 202. The width sensors 202, 203 and 204 are optical sensors for detecting the width of the article and discriminating whether the article is fed into the shredding path 201. The width sensors 202, 203 and 204 continuously emit sensing lights. In a case that the sensing light emitted from the width sensor 202, 203 or 204 is sheltered, it is meant that the article is fed into the shredding path 201. The thickness detecting module 205 is connected to the control unit to detect the thickness of the article to be shredded.

Please refer to FIG. 2 again. The length of the shredding path 201 is slightly greater than the width of the A3-sized document such that the A3-sized document is permitted to be fed into the shredding path 201. That is, the length of the shredding path 201 is slightly greater than 297 mm. The width sensors 202, 203 and 204 of the width and thickness detecting mechanism 200 are used for detecting the width of the article. In a case that both of the first width sensor 202 and the second width sensor 203 are triggered by the article or both of the first width sensor 202 and the third width sensor 204 are triggered, it is meant that the article is relatively narrower and the width of the article is deemed as a first article width. Whereas, in a case that the first width sensor 202, the second width sensor 203 and the third width sensor 204 are all triggered by the article, it is meant that the article is relatively wider and the width of the article is deemed as a second article width. For example, the first article width is equal to the width of a general A4-sized document and the second article width is equal to the width of a general A3-sized document. That is, the use of these three width sensors 202, 203 and 204 may facilitate estimating the width of the article. In accordance with a key feature of the present invention, the allowable thickness value of the article to be shredded is adjusted according to the width of the article. For example, in a case that a stack of ten A4-sized paper sheets are allowed to be fed into the shredding path 201 for performing the shredding operation, only seven or less number of A3-sized paper sheets are allowed to be fed into the shredding path 201 for performing the shredding operation.

Figure 3:
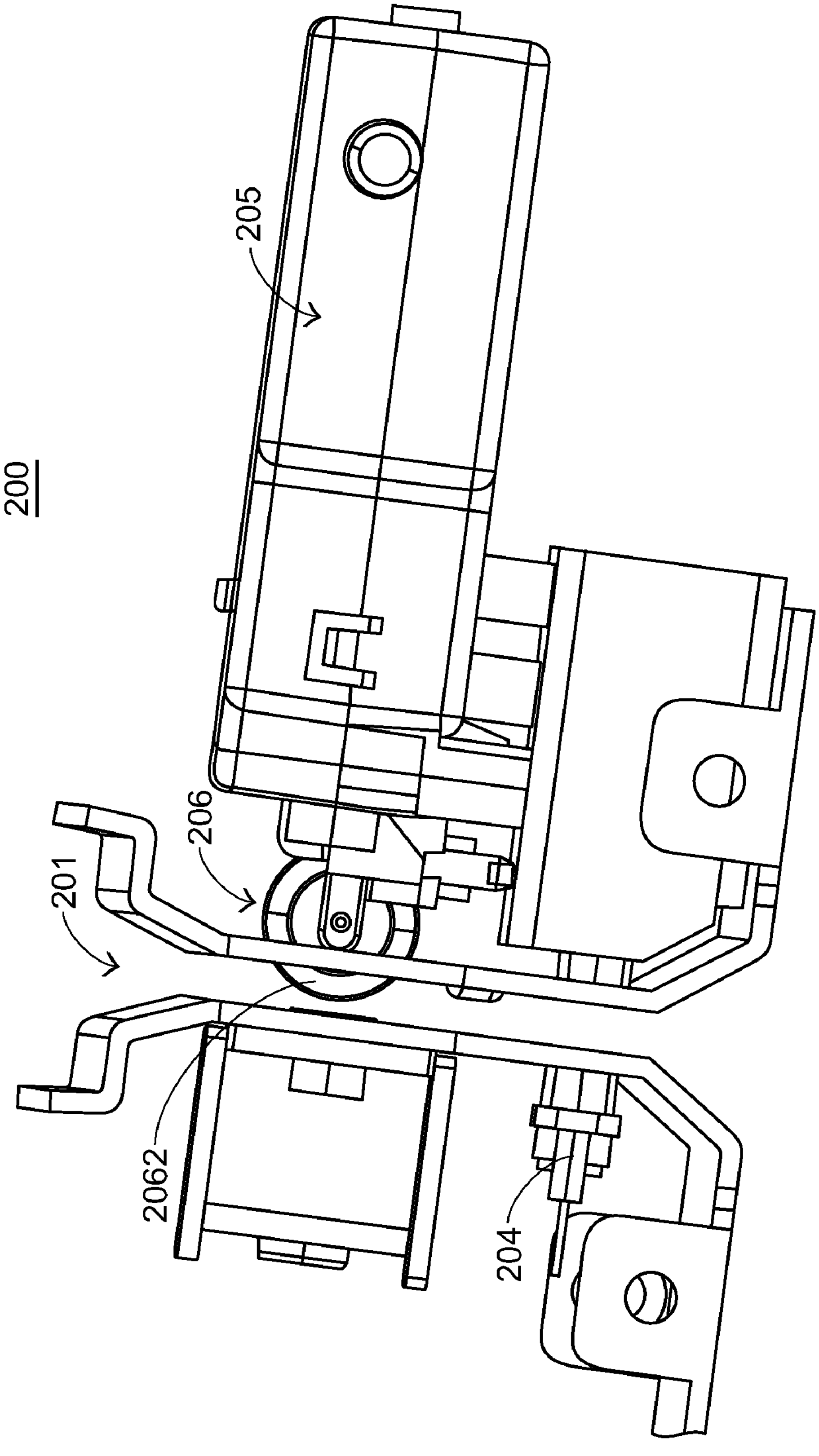
FIG. 3 is a schematic side view illustrating the width and thickness detecting mechanism of a shredder according to the preferred embodiment of the present invention.

FIG. 3 is a schematic side view illustrating the width and thickness detecting mechanism of a shredder according to the preferred embodiment of the present invention. In the width and thickness detecting mechanism 200, a sustaining element 206 has a sustaining roller 2062 to be sustained against the article to be shredded. When the article is fed into the shredding path 201, the article is sustained against the sustaining roller 2062 of the sustaining element 206. As the article is continuously moved to the deeper location of the shredding path 201, the article will push forward the sustaining element 206 such that the thickness detecting module 205 can sense the thickness of the article. At the same time, the article that is sustained against the sustaining roller 2062 is continuously moved toward the outlet of the shredding path 201 upon rotation of the sustaining roller 2062. Until the article is detected by first width sensor 202, the shredding knife assembly (not shown) is driven to implement a shredding operation. The detailed structures of the thickness detecting module 205 will be illustrated later.

Figure 4:
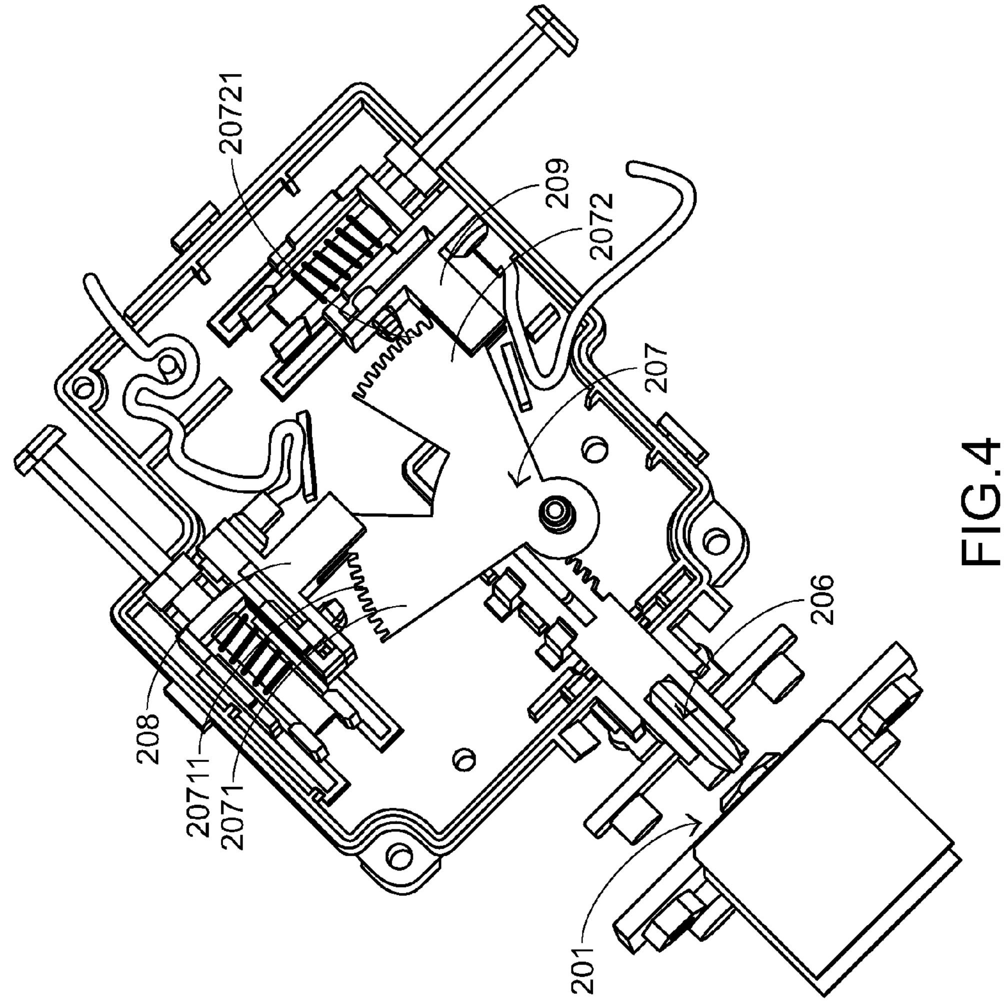
FIG. 4 is a schematic perspective view illustrating the interior of the width and thickness detecting mechanism of a shredder according to the preferred embodiment of the present invention.
Figure 5:
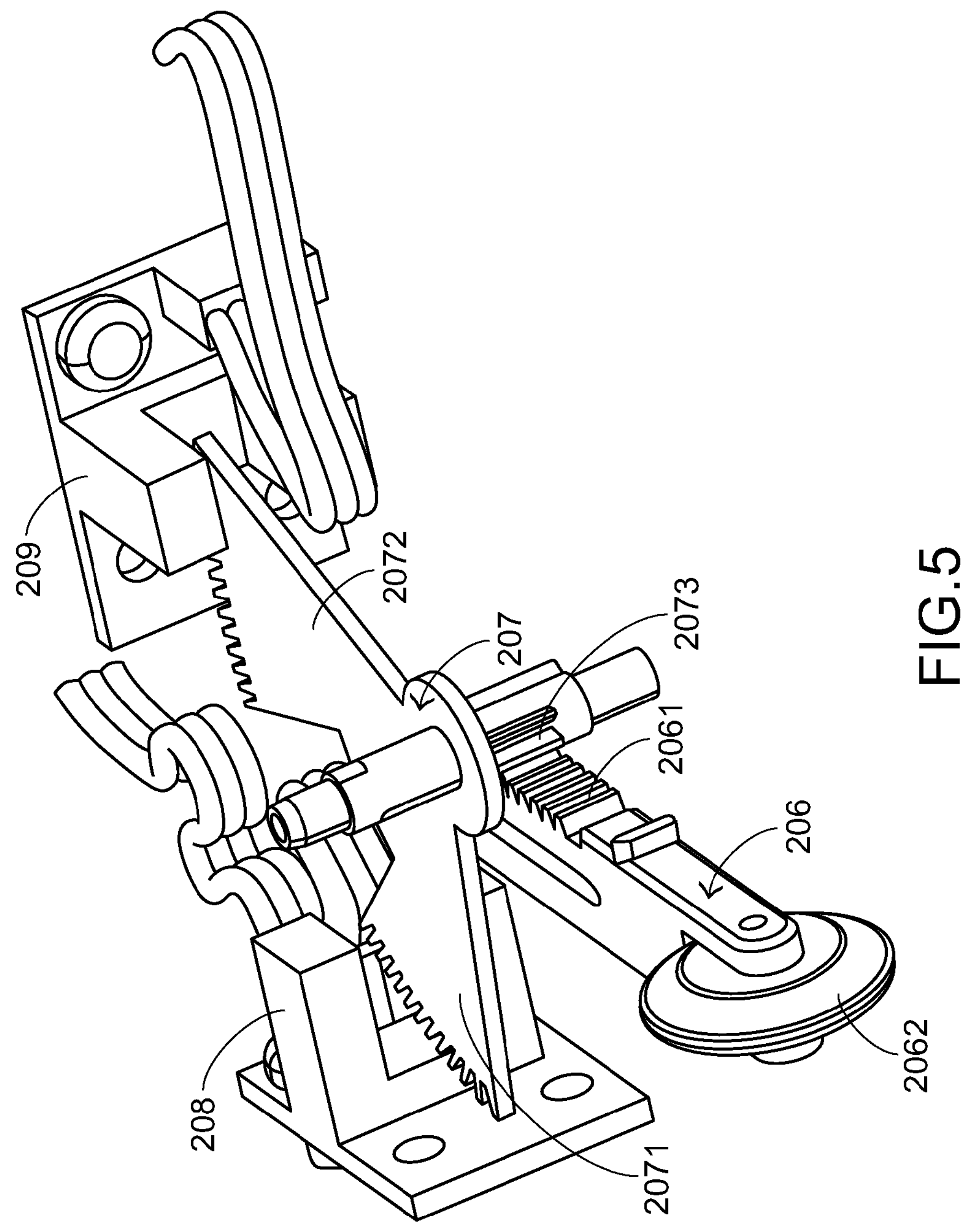
FIG. 5 is a schematic perspective view partially illustrating the interior of the width and thickness detecting mechanism shown in FIG. 4 and taken from a different viewpoint.

FIG. 4 is a schematic perspective view illustrating the interior of the width and thickness detecting mechanism of a shredder according to the preferred embodiment of the present invention. FIG. 5 is a schematic perspective view partially illustrating the interior of the width and thickness detecting mechanism shown in FIG. 4 and taken from a different viewpoint.

Please refer to FIG. 4 and FIG. 5. The thickness detecting module 205 comprises a sustaining element 206, a thickness detecting element 207, a first thickness sensor 208 and a second thickness sensor 209. As previously described, the sustaining element 206 is shifted as the article is sustained against the sustaining element 206. The thickness detecting element 207 is contacted with the sustaining element 206. As the sustaining element 206 is moved, the thickness detecting element 207 is rotated. The thickness detecting element 207 includes a first detecting plate 2071 and a second detecting plate 2072. The first detecting plate 2071 has multiple first sheltering parts 20711. The second detecting plate 2072 has multiple second sheltering parts 20721. The first detecting plate 2071 and the second detecting plate 2072 are integrally formed with the thickness detecting element 207. In this embodiment, the first sheltering parts 20711 and the second sheltering parts 20721 are saw-toothed structures. In addition, the thickness detecting element 207 further has a first rack part 2073. The sustaining element 206 has a second rack part 2061. The first rack part 2073 is engaged with the second rack part 2061, so that the thickness detecting element 207 is rotated as the sustaining element 206 is linearly moved.

By detecting the first sheltering parts 20711, the first thickness sensor 208 can realize whether the thickness of the article is greater than a first allowable thickness value according to the rotating condition of the first detecting plate 2071. By detecting the second sheltering parts 20721, the second thickness sensor 209 can realize whether the thickness of the article is greater than a second allowable thickness value according to the rotating condition of the second detecting plate 2072. Normally, the first thickness sensor 208 and the second thickness sensor 209 are optical sensors that continuously emit sensing lights. In a case that the sensing light emitted from the first thickness sensor 208 is sheltered by the first sheltering parts 20711, it is meant that the thickness of the article reaches the first allowable thickness value.

Whereas, in another case that the sensing light emitted from the second thickness sensor 209 is sheltered by the second sheltering parts 20721, it is meant that the thickness of the article reaches the second allowable thickness value. In an embodiment, the first thickness sensor 208 is responsible for detecting the thickness of an A4-sized article and the first allowable thickness value is equal to the overall thickness of ten A4-sized paper sheets. The second thickness sensor 209 is responsible for detecting the thickness of an A3-sized article and the second allowable thickness value is equal to the overall thickness of seven A3-sized paper sheets.

Hereinafter, the process of shredding a stack of A4-sized paper sheets will be illustrated in more details. First of all, a stack of A4-sized paper sheets are fed into the shredding path 201. When the first width sensor 202 and the second width sensor 203 are triggered by the A4-sized paper sheets, the shredding knife assembly (not shown) is driven to implement a shredding operation. At the same time, the control unit allocates the first thickness sensor 208 to detect the thickness of the article to be shredded (i.e. the A4-sized paper sheets). In addition, due to the thickness of the article, the article is sustained against the sustaining element 206 and pushes forward the sustaining element 206. Since the second rack part 2061 of the sustaining element 206 is engaged with the first rack part 2073 of the thickness detecting element 207, the thickness detecting element 207 is rotated as the sustaining element 206 is moved. Upon rotation of the thickness detecting element 207, the first saw-toothed structure of the first sheltering parts 20711 of the first detecting plate 2071 enters the sensing range of the first thickness sensor 208 to shelter the sensing light emitted from the first thickness sensor 208. As the first detecting plate 2071 is continuously rotated, the sensing light penetrates through the gap between the first and second saw-toothed structures of the first detecting plate 2071. As the first detecting plate 2071 is continuously rotated, the second saw-toothed structure shelters the sensing light emitted from the first thickness sensor 208 again. In other words, the sensing light emitted from the first thickness sensor 208 is alternately sheltered or unsheltered as the first detecting plate 2071 is rotated. Until the rotation of the first detecting plate 2071 is interrupted, the control unit will count the total number of saw-toothed structures that are transported across the sensing range of the first thickness sensor 208, thereby estimating the thickness of the article.

In some embodiments, the thickness of the article is substantially equal to the thickness of a paper sheet if a saw-toothed structure is transported across the sensing range of the first thickness sensor 208. Alternatively, the thickness of the article is substantially equal to the thickness of two or more paper sheets if a saw-toothed structure is transported across the sensing range of the first thickness sensor 208. According to the total number of saw-toothed structures that are transported across the sensing range of the first thickness sensor 208, the control unit can estimate the thickness of the article. In a case that the thickness of the article to be shredded (i.e. the A4-sized paper sheets) is smaller than the first allowable thickness value (e.g. ten A4-sized paper sheets' thickness), the shredding operation is continuously performed under control of the control unit. On the other hand, if the thickness of the article to be shredded (i.e. the A4-sized paper sheets) is greater than the first allowable thickness value (e.g. ten A4-sized paper sheets' thickness), the shredding operation is interrupted under control of the control unit.

Hereinafter, the process of shredding a stack of A3-sized paper sheets will be illustrated in more details. First of all, a stack of A3-sized paper sheets are fed into the shredding path 201. When the first width sensor 202, the second width sensor

203 and the third width sensor 204 are triggered by the A3-sized paper sheets, the shredding knife assembly (not shown) is driven to implement a shredding operation. At the same time, the control unit allocates the second thickness sensor 209 to detect the thickness of the article to be shredded (i.e. the A3-sized paper sheets). In addition, due to the thickness of the article, the article is sustained against the sustaining element 206 and pushes forward the sustaining element 206. As the sustaining element 206 is moved, the thickness detecting element 207 is rotated. Upon rotation of the thickness detecting element 207, the saw-toothed structures of the second sheltering parts 20721 of the second detecting plate 2072 pass through the sensing range of the second thickness sensor 209. In other words, the sensing light emitted from the second thickness sensor 209 is alternately sheltered or unsheltered as the second detecting plate 2072 is rotated. Until the rotation of the second detecting plate 2072 is interrupted, the control unit will count the total number of saw-toothed structures that are transported across the sensing range of the second thickness sensor 209, thereby estimating the thickness of the article. According to the total number of saw-toothed structures that are transported across the sensing range of the second thickness sensor 209, the control unit can estimate the thickness of the article. In a case that the thickness of the article to be shredded (i.e. the A3-sized paper sheets) is smaller than the second allowable thickness value (e.g. seven A3-sized paper sheets' thickness), the shredding operation is continuously performed under control of the control unit. On the other hand, if the thickness of the article to be shredded (i.e. the A3-sized paper sheets) is greater than the second allowable thickness value (e.g. seven A3-sized paper sheets' thickness), the shredding operation is interrupted under control of the control unit.

It is noted that, however, those skilled in the art will readily observe that numerous modifications and alterations may be made while retaining the teachings of the invention. For example, the saw-toothed structures of the sheltering parts 20711 and 20721 of the detecting plates 2071 and 2072 may be replaced by a plurality of perforations. Since the sensing light emitted from the thickness sensor 208 or 209 is alternately sheltered or unsheltered as the detecting plate 2071 or 2072 is rotated, the control unit can also estimate the thickness of the article by counting the total number of perforations that are transported across the sensing range of the thickness sensor 208 or 209.

From the above embodiment, the width and thickness detecting mechanism of the present invention is capable of adjusting the allowable thickness value according to the width of the article. After two or three of the width sensors are triggered, the first thickness sensor or the second thickness sensor is selectively allocated for detecting the thickness of the article. Since the allowable thickness value is reduced when a relative wider article is shredded, the possibility of fracturing the shredding knife assembly from the high torsion force of the shredding knife assembly is minimized. Therefore, the shredder with the width and thickness detecting mechanism of the present invention has an extended use life.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A width and thickness detecting mechanism of a shredder for detecting a width of an article and adjusting an allowable thickness value of said article according to said width of said article, said width and thickness detecting mechanism comprising:

a first width sensor disposed in a shredding path;

a second width sensor disposed at a first side of said first width sensor;

a third width sensor disposed at a second side of said first width sensor;

a thickness detecting module disposed in said shredding path and comprising a sustaining element, a thickness detecting element, a first thickness sensor and a second thickness sensor, wherein said sustaining element is moved as said article is sustained against said sustaining element, said thickness detecting element is contacted with said sustaining element and rotated as said sustaining element is moved, said thickness detecting element includes a first detecting plate with multiple first sheltering parts and a second detecting plate with multiple second sheltering parts, said first thickness sensor realizes whether a thickness of said article is greater than a first allowable thickness value according to a rotating condition of said first sheltering parts, and said second thickness sensor realizes whether said thickness of said article is greater than a second allowable thickness value according to a rotating condition of said second sheltering parts; and a control unit connected to said first width sensor, said second width sensor, said third width sensor, said first thickness sensor and said second thickness sensor for controlling implementation or interruption of a shredding operation according to said width and said thickness of said article, wherein if any two of said first width sensor, said second width sensor and said third width sensor sense that said article enters said shredding path, said width of said article is deemed as a first article width and said control unit allocates said first thickness sensor to detect whether said thickness of said article is greater than said first allowable thickness value, or if all of said first width sensor, said second width sensor and said third width sensor sense that said article enters said shredding path, said width of said article is deemed as a second article width and said control unit allocates said second thickness sensor to detect whether said thickness of said article is greater than said second allowable thickness value.

2. The width and thickness detecting mechanism according to claim 1 wherein said shredding operation is interrupted under control of said control unit if said first thickness sensor discriminates that said thickness of said article is greater than said first allowable thickness value, or said shredding operation is continuously under control of said control unit if said first thickness sensor discriminates that said thickness of said article is equal to or smaller than said first allowable thickness value.

3. The width and thickness detecting mechanism according to claim 1 wherein said shredding operation is interrupted under control of said control unit if said second thickness sensor discriminates that said thickness of said article is greater than said second allowable thickness value, or said shredding operation is continuously under control of said control unit if said second thickness sensor discriminates that said thickness of said article is equal to or smaller than said second allowable thickness value.

4. The width and thickness detecting mechanism according to claim 1 wherein said first width sensor, said second width sensor, said third width sensor, said first thickness sensor and said second thickness sensor are optical sensors continuously emitting sensing lights, and said first width sensor, said second width sensor, said third width sensor, said first thickness sensor and said second thickness sensor are triggered when respective sensing light are sheltered.

5. The width and thickness detecting mechanism according to claim 1 wherein said first article width is 210 mm and said second article width is 297 mm.

6. The width and thickness detecting mechanism according to claim 1 wherein said first article width is smaller than said second article width.

7. The width and thickness detecting mechanism according to claim 1 wherein said first sheltering parts and said second sheltering parts are saw-toothed structures, and said thickness of said article is estimated by counting the total number of saw-toothed structures that have sheltered respective sensing light emitted from said first thickness sensor or said second thickness sensor.

8. The width and thickness detecting mechanism according to claim 1 wherein said first sheltering parts and said second sheltering parts are perforations, and said thickness of said article is estimated by counting the total number of perforations that have transported across respective sensing range of said first thickness sensor or said second thickness sensor.

9. The width and thickness detecting mechanism according to claim 1 wherein said first detecting plate and said second detecting plate are integrally formed with said thickness detecting element.

10. The width and thickness detecting mechanism according to claim 1 wherein said thickness detecting element has a first rack part, and said sustaining element has a second rack part engaged with the first rack part, so that said thickness detecting element is rotated as said sustaining element is linearly moved.

11. The width and thickness detecting mechanism according to claim 1 wherein said sustaining element has sustaining roller, which is sustained against said article for facilitating transporting said article in said shredding path.

* * * * *